US009465510B2

(12) United States Patent
Stonehouse

(10) Patent No.: US 9,465,510 B2
(45) Date of Patent: Oct. 11, 2016

(54) DATA VISUALISATION SYSTEM

(71) Applicant: N-CUBIC Limited, Wolverhampton (GB)

(72) Inventor: Charles Peter William Stonehouse, Wolverhampton (GB)

(73) Assignee: N-CUBIC Limited, Wolverhampton (GB)

( * ) Notice: Subject to any disclaimer, the term of this patent is extended or adjusted under 35 U.S.C. 154(b) by 213 days.

(21) Appl. No.: 13/899,349

(22) Filed: May 21, 2013

(65) Prior Publication Data

US 2013/0326411 A1    Dec. 5, 2013

Related U.S. Application Data

(60) Provisional application No. 61/653,952, filed on May 31, 2012.

(51) Int. Cl.
*G06F 3/048* (2013.01)
*G06F 3/0481* (2013.01)
*G06F 17/30* (2006.01)

(52) U.S. Cl.
CPC ....... *G06F 3/0481* (2013.01); *G06F 17/30572* (2013.01)

(58) Field of Classification Search
CPC .................. G06F 17/30572; G06F 17/30572

USPC ......................................................... 345/440
See application file for complete search history.

(56) References Cited

U.S. PATENT DOCUMENTS 7,333,998 B2 *   2/2008   Heckerman et al.
2004/0183800 A1 *   9/2004   Peterson .................. 345/440

* cited by examiner

*Primary Examiner* — Matthew Ell
*Assistant Examiner* — Mohamed Abou El Seoud
(74) *Attorney, Agent, or Firm* — Seed IP Law Group PLLC

(57) ABSTRACT

A virtual environment is provided for displaying multidimensional models of data. Embodiments of the system provide an interface which allows a user to navigate intuitively and efficiently between alternative views of the data represented in the model, and to combine additional data categories with the existing model. Embodiments of the system draw upon cellular data stored in a database structure to represent the data in a graphical form on a visual display, wherein cellular data are data partitioned by at least two interrelated data categories into discrete 'cells'. Models may be manipulated, viewed and compared using a user control device, such as a touch screen display. Alterations to the data stored in the database may be represented by commensurate changes to the objects displayed in the model, and the relational forms and shapes formed between the categories of data.

13 Claims, 17 Drawing Sheets
(12 of 17 Drawing Sheet(s) Filed in Color)

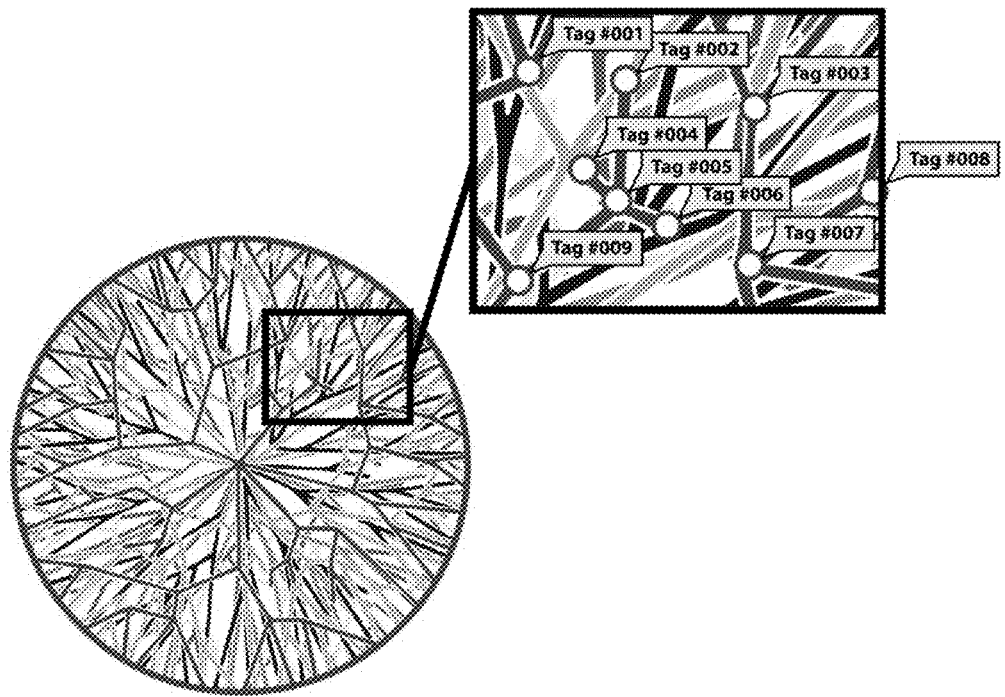
FIGURE 42
FIGURE 43
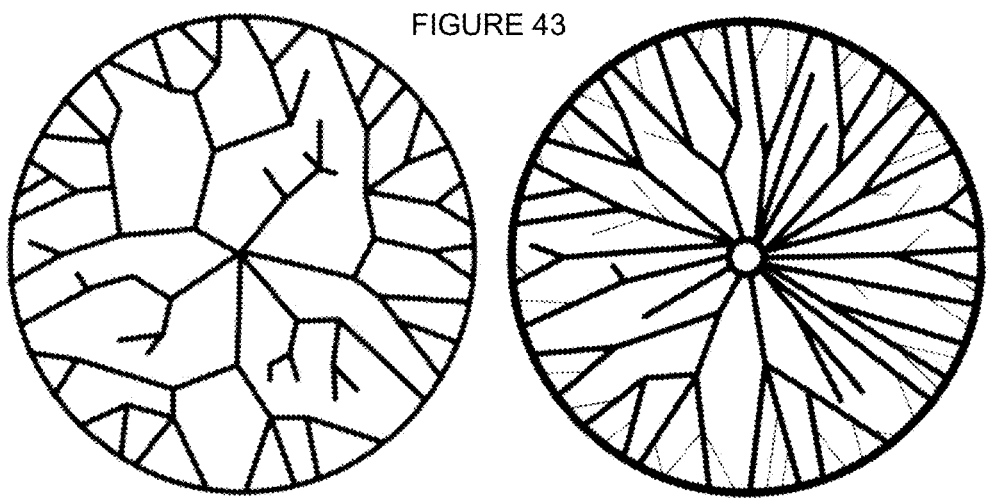

US 9,465,510 B2

DATA VISUALISATION SYSTEM

BACKGROUND

Technical Field

The present disclosure relates to a system, method, and user interface, for displaying, editing and manipulating visual representations of data on a display.

BRIEF SUMMARY

In the context of data modeling, it is desirable to provide a spatial representation of data (e.g., in a cartographical form) in which multiple categories of data may be displayed to a user, to provide enhanced functionality, and to reduce model redundancy and eliminate the need for duplication where many categories of data may be plotted on the same, or similar, scales.

It is also desirable to provide an interactive model which a user may navigate in an intuitive manner to ascertain the particular data sets of interest to that user.

Furthermore, it is desirable to provide an interface and method for manipulating data so as to visualise patterns and trends in a data set, without requiring multiple independent models or computational comparisons. It is preferable for a user to be provided with a system which is capable of representing the data in a large variety of formats, so as to create intuitive cartographic representations of the data and allow, or alternatively to model data in hierarchical tree structures so as to highlight relationships between subsets or categories of data in the data set. Furthermore, it is desirable for a user to be able to navigate between visualizations of the data in an intuitive manner, so as to provide a more efficient and useful tool for conducting research, to be used as an educational or business tool, for the purpose of allowing users to access historically archived data, or to allow media producers to generate graphics more easily.

The system of embodiments of the current disclosure provides a virtual environment for displaying multidimensional models of data. In addition to displaying models, embodiments of the system provide an interface which allows a user to navigate intuitively and efficiently between alternative views of the data represented in the model, and to combine additional data categories with the existing model. Embodiments of the system draw upon cellular data stored in a database structure to represent the data in a graphical form on a visual display, wherein cellular data are data partitioned by at least two interrelated data categories into discrete 'cells'.

The models created by the system may be manipulated, viewed and compared using a user control device, such as a touch screen display. Alterations to the data stored in the database may be represented by commensurate changes to the objects displayed in the model, and the relational forms and shapes formed between the categories of data. Changes made by a user to these objects, forms and shapes may be reflected in the database, if desired.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Examples of the disclosure will now be described by way of example only, with reference to the accompanying drawings.

FIGS. 38 to 43 show various further example visualisations of data that may be produced by the system of the disclosure.

DETAILED DESCRIPTION

Figure 1:
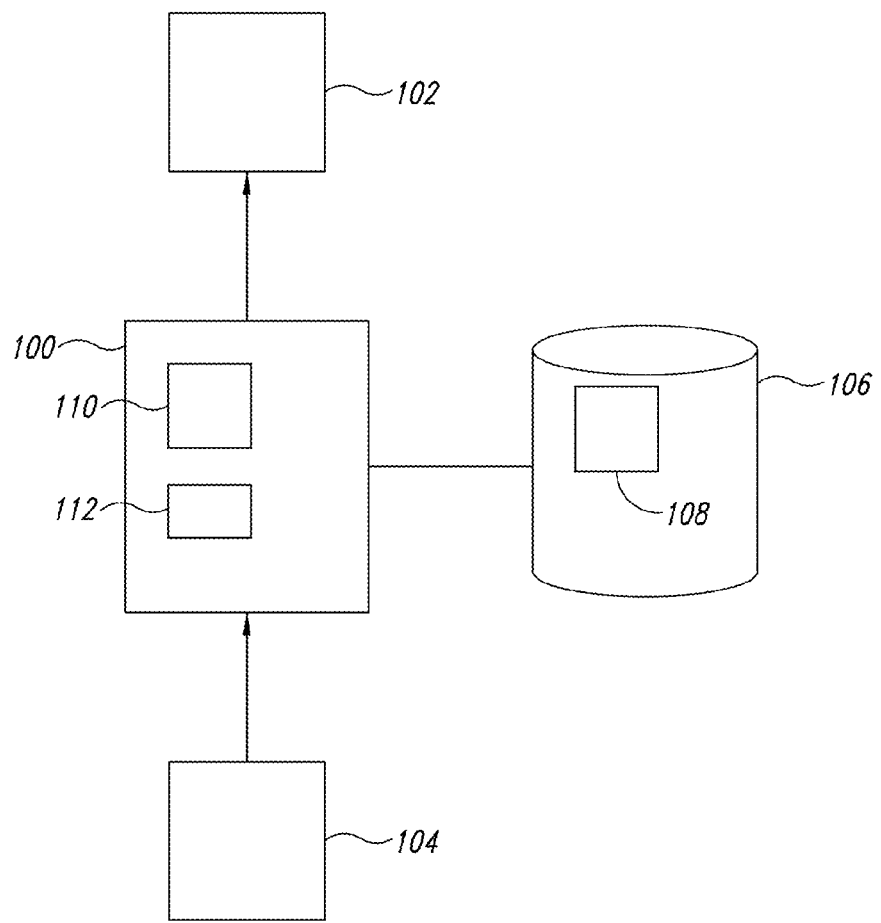
FIG. 1 is a block diagram representing an embodiment of the system according to the disclosure.

According to an embodiment of the disclosure, we provide a user interface for manipulating visual representations of data, the user interface being operable to receive from a user a selection of a plurality of categories, each selected category representing a category of data stored in a dataset, the dataset comprising a plurality of data cells each comprising data values associated with the plurality of categories, display to the user a virtual multidimensional representation of the dataset, each dimension of the virtual representation representing a respective category of data selected by the user, receive from the user a selection of a first and a second category of data displayed in the virtual representation, receive from the user a command to combine the first and second categories of data, determine whether the first and second categories are suitable for combination, and when the first and second categories are suitable for combination to replace the first and second categories of data with a third category of data representing a logical combination of the first and second categories, and display a revised virtual representation of the dataset, wherein the dimensions representing the first and second categories of data in the original representation are replaced with a representation of a third category of data representing a logical combination of the first and second categories of data.

According to another embodiment of the disclosure, we provide a method of displaying virtual representations of data, comprising storing a dataset comprising a plurality of data cells, each cell comprising data values associated with a plurality of categories, receiving from a user a selection of a plurality of categories, each selected category representing a category of data stored in a dataset; displaying to the user a virtual representation of the dataset, each dimension of the virtual representation representing a respective category of data selected by the user, receiving from the user a selection of a first and a second category of data displayed in the virtual representation, receiving from the user a command to combine the first and second categories of data, determining whether the first and second categories are suitable for combination, and when the first and second categories are suitable for combination, replacing the first and second categories of data with a third category of data representing a logical combination of the first and second categories, and displaying a revised virtual representation of the dataset, wherein the dimensions representing the first and second categories of data in the original representation are replaced with a representation of a third category of data representing a logical combination of the first and second categories of data.

According to another embodiment of the disclosure, we provide a system for displaying virtual representations of data, comprising a storage device, operable to store a dataset comprising a plurality of data cells, each cell comprising data values associated with a plurality of categories, a visual display device, and a user input device, wherein the user device is operable to receive inputs from a user, and the display device is operable to display to the user a virtual representation of the dataset, in accordance with the user interface of claim 1.

According to an embodiment of the disclosure, and with reference to FIG. 1, the system comprises a processing device 100, having a memory 110 and a computer processor 112. The processing device 100 is connected to a storage device 106, which may be a hard disk drive or a solid state drive, for example. The storage device may be a non-volatile electronic storage device.

A user input device 104 is connected to the processing device 100, to allow a user to input commands to the processing device 100. The user input device 104 may be an electronic input device or combination of devices, such as a keyboard, a mouse, a keyboard and mouse, a touch screen display, a keypad, or the like.

The processing device 100 is connected to a visual display 102, which may be any form of display device suitable for displaying data or images to a user.

Typically, the processor 112 may take the form of a microprocessor. The control subsystem memory 110 may also include one or more non-transitory processor- or computer-readable storage media, for example read only memory (ROM), random access memory (RAM), and data store 216 (e.g., solid-state storage media such as flash memory or EEPROM, spinning storage media such as hard disk). The non-transitory processor- or computer-readable storage media may be in addition to any non-transitory storage medium (e.g., registers) which is part of the processor 112. The processing device 100 may include one or more buses (not shown) coupling various components together, for example one or more power buses, instruction buses, data buses, etc.

As illustrated, the memory 110, or some other non-transitory processor- or computer-readable storage media, stores instructions and/or data or values for variables or parameters. The sets of data may take a variety of forms, for example a lookup table, a set of records in a database, etc. The instructions and sets of data or values are executable by the processor 112 and include all or portions of what is referred to herein as "modeling software". Execution of the instructions and sets of data or values causes the processor 112 to perform specific acts to cause the system for displaying virtual representations of data to represent the data categories and/or cell information described herein, generate user interfaces as described herein and perform the manipulation of visual representations of data and perform data modeling as described herein.

The processing device 100 may use memory 112 (e.g., RAM) in a conventional fashion, for volatile storage of instructions, data, etc. The processing device 100 may use storage device 106 to log or retain information, for example data to be represented by the system shown in FIG. 1 may be stored in a database 108. The instructions are executable by the processor 112 to control operation of the system shown in FIG. 1.

In an embodiment (see FIG. 2), the visual display 116 forms a part of a visual display unit 114, which also includes a user input device 118 to enable commands to be input to the visual display unit 114 by a user. The visual display 116 and the user input device 118 may form an integrated touch-screen.

In an embodiment, the system may comprise one or more image or gesture capture devices, to enable a user to interact with the system using a gesture-based interface. In this way, gestures made by a user may be interpreted by the system to represent selection of an option within a program, to enable manipulation of a visualisation of a model, and/or to select a portion of a visualisation (to 'zoom in' on a portion of a visualisation, for example). The gesture-based interface may enable a user to interact with the system using gestures to achieve any of the functionality of the system that is otherwise available using a standard touch-screen interface or standard user-input devices such as mice and keyboards.

In an embodiment (see FIG. 3), the processing device 120 may include a storage device 126 such as described above. The system may include a separate user input device 104 and visual display 102, or alternatively, the system may include a visual display unit 114 having an integrated user input device such as that described above.

In an embodiment (see FIG. 4), the processing device 130 may include an integrated visual display 132, and user input device 134, thus forming a self-contained unit which is capable of displaying data or images to a user and receiving inputs directly from the user.

Figure 5:
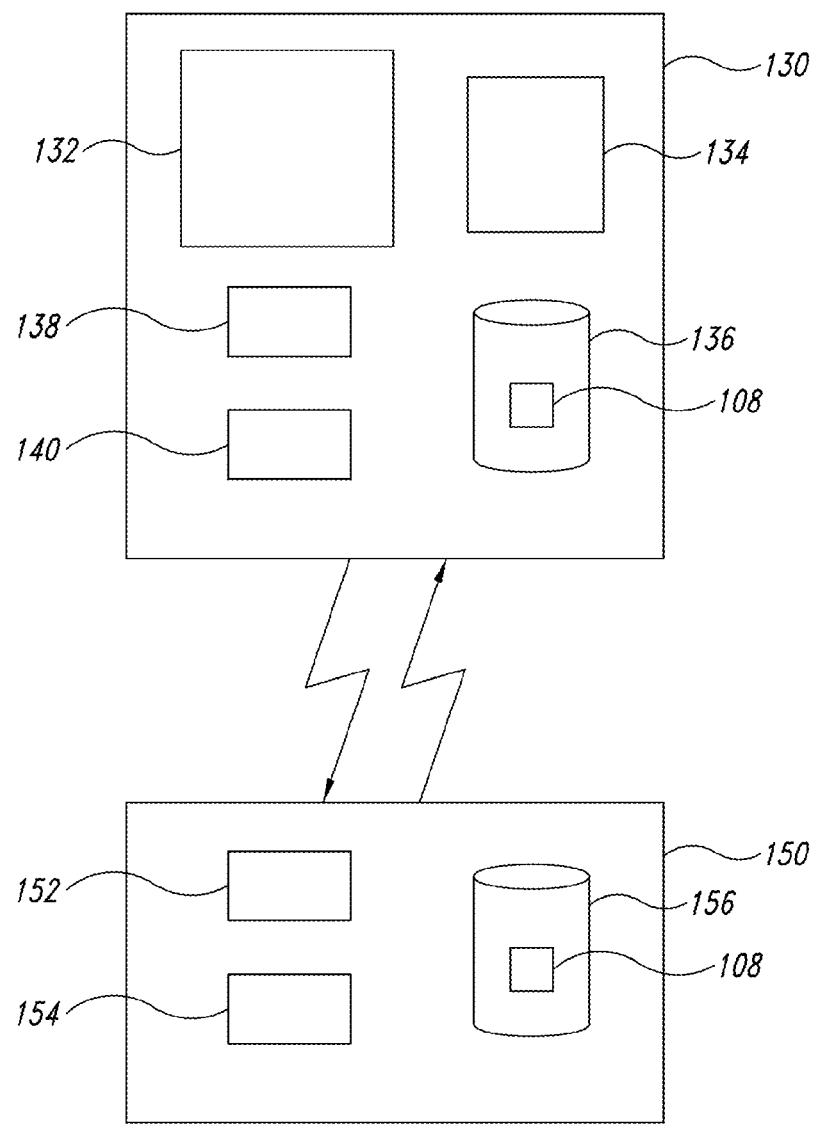
FIG. 5 is a block diagram representing the system of FIG. 4, further comprising a wirelessly connected device providing remote storage.

In an embodiment (see FIG. 5), the system may include a processing device 130 as described above, further including a remote storage unit 150. The remote storage unit 150 may be connected wirelessly to the processing device 130, and comprises a storage device 156, a processor 152 and a memory 154. In this manner, data may be stored remotely in the storage device 156 of the remote storage unit 150, and provided wirelessly to the processing device 130 when requested. All, or a part, of the data provided to the processing device 130 may be stored in a local memory device 136 which is used by the processing device 130, so as to make the data available locally to the processor 138 of the device.

Figure 2:
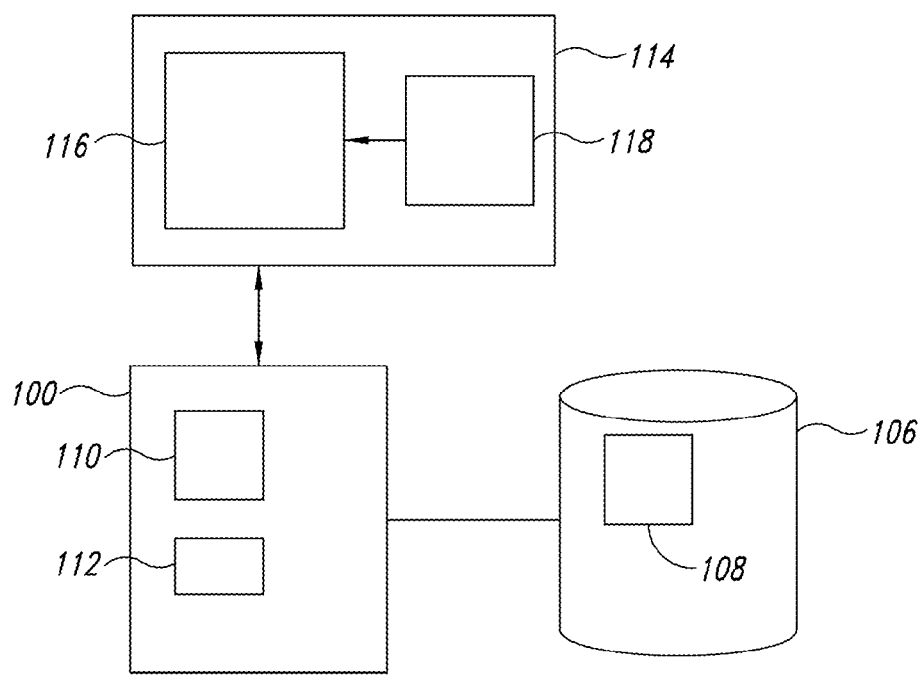
FIG. 2 is a block diagram representing a further embodiment of the system according to the disclosure, wherein the visual display includes touch-screen user interface functionality.
Figure 3:
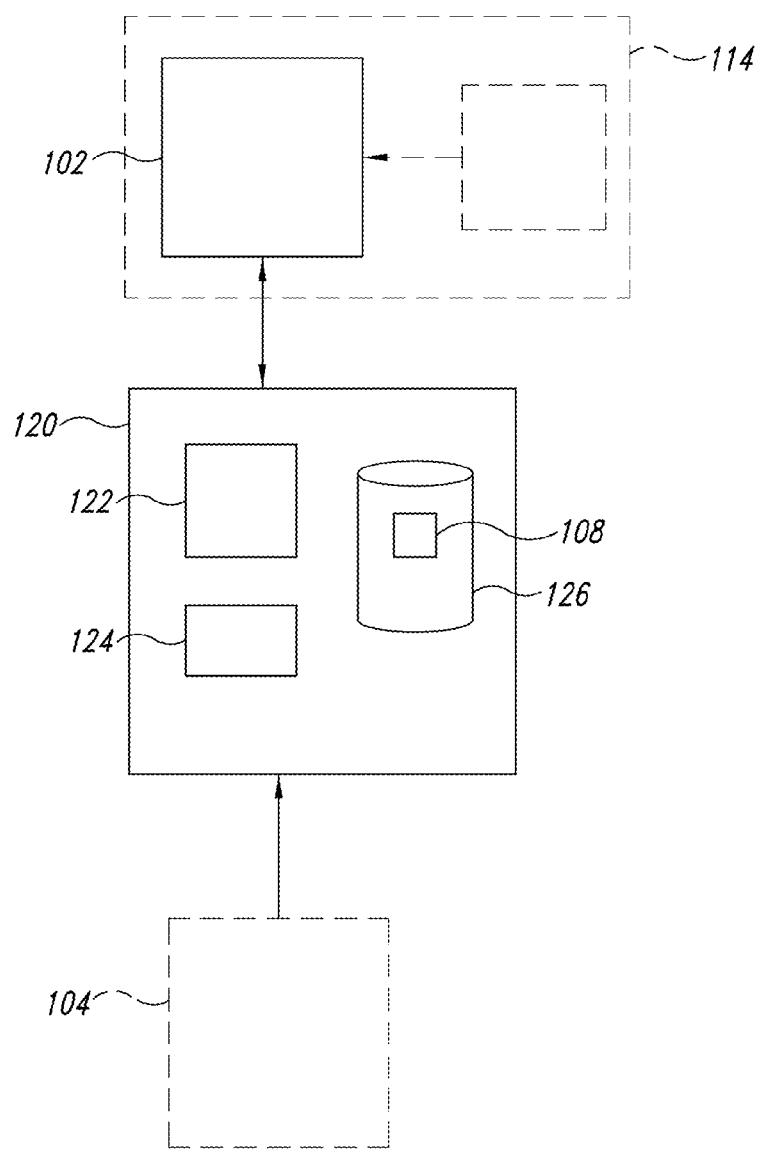
FIG. 3 is a block diagram representing a further embodiment of the system according to the disclosure, wherein the processing device comprises a storage device.
Figure 4:
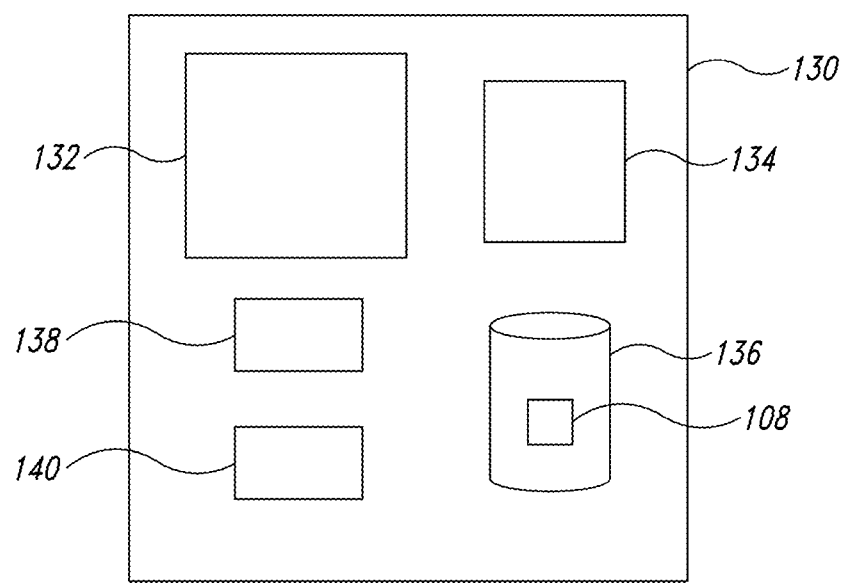
FIG. 4 is a block diagram representing a further embodiment of the system according to the disclosure, wherein the processing unit comprises storage, a visual display, and a user control device.

In embodiments, data to be represented by the system are stored in a database 108. The database 108 is stored in a non-volatile storage device which may be used by the processing device 120,130 (as shown in FIGS. 3 and 4), or it may be a separate from the processing device (as shown in FIGS. 1 and 2). It should be understood that while the term 'database' is used herein, this term is not intended to limit the structure in which the data may be stored or made available to the processing device 100, and that any ordered structure may be suitable for storing and accessing the data.

When a model is created using the system, data are loaded from the database stored on the storage device, to the local memory of the processing device. Objects for use in an object-oriented modeling environment (or any other modeling environment or using any modeling tool) may be created by the system, as appropriate, to represent the data categories and/or cell information used by the modeling software. The integrity of the data in the database is maintained throughout, and is typically not overwritten by the actions of the user, unless the user has first selected an 'editing' mode for that purpose.

The definitions of model specifications and manipulations of models by a user are performed at a level abstracted from the database itself. Such specifications and projections of a model may be saved to the storage device or elsewhere, as images, as templates or the like, so that the user can create an identical model at a later time.

It will be understood by a person skilled in the art that in addition to the hardware embodiments described, many configurations of these (and other) hardware components would be suitable for use with the system described herein, without departing from the spirit or scope of the disclosure. It is envisaged that features from one embodiment described herein may be combined with features from one or more other embodiments described herein.

The visualisations of models created by the system fall into three general categories. In each of these categories, the data are modeled within the virtual environment in a different manner, allowing comparisons to be drawn between alternative sets of data within the dataset. The system generates virtual multidimensional representations (hereinafter also referred to as 'visualisations') of the dataset, each dimension of the virtual representation representing a respective category of data selected by the user, or representing a separation between classes or subcategories of data within the dataset.

The first category, or 'view', is an orthographic view, wherein data are projected to form a 2D visualisation. Where the data are projected from a 3D data set (having x, y and z axes), the 2D projection may show the x and y, the x and z or the y and z axes.

The second view is a 3D visualisation, wherein x, y and z axes are shown, and the data are modeled over these three axes.

The third view is a 'Tree' model, wherein data are visualised either in 2D, or in 3D, but wherein at least one of the axes may form an arbitrary scale, which may or may not be directly related to the data being modeled.

A visualisation of a 2D or 3D 'object', representing aspects of a model, may be displayed to a user on a standard two-dimensional display, as is commonly known. It should be understood that 'three-dimensional' display technologies may also be implemented to present a 3D visualisation to a user, and it is envisaged that the display of visualisations of models to a user, using the system, is not limited to conventional two-dimensional displays.

The data shown in any one of these views may be further deconstructed into subsets, or 'classes', wherein elements within the data set that share a common value are represented in a similar manner. For example, data elements within a class may share the same color when represented in the model. Furthermore, the system may represent the data in classes, such that values of data sharing a class are averaged, so that each class is represented as a single element in the model.

Any 3D form that the system generates for display to a user, can also be exported to a rapid prototyping machine or other manufacturing system. In doing so, the system may be used to create three dimensional physical objects.

For example, a model may be formed through extrusion, or by moulding, for use as an educational tool, an alternative form of data display for use in a museum, an exhibition, or the like, or as a model to be used for research purposes.

With reference to FIGS. 6 to 37, we now describe a virtual modeling environment provided by the system. FIGS. 6 to 25 illustrate example visual displays which may be generated for display on the display device. FIGS. 26 to 37 show aspects of the user interface which allow the user to control, configure and manipulate the displays so as to provide the applicable information.

The functionality of the system is described herein with reference to a particular dataset, by way of example only. It should, of course, be understood that the system of embodiments of the current disclosure may be used to model a wide variety of data, and it is not intended that its use should be limited to modeling the dataset herein described.

As applied to a cartographic dataset, the system uses data representing the division of the whole of the surface of the earth into many small parts, or cells, of equal area. These cells are as small (in terms of area) as practicably possible, but in use the size, and therefore number of cells of data, is dictated by the quality of the available data, and the limitations of the storage, memory, and processing power of the hardware on which the system is to be implemented.

The 'area' of this cellular map of the earth is, by default, represented by the x and y axes in the system. These cells are extruded along the along the z axis, which by default represents time. These, in turn, are divided along the z axis, into as many cell divisions as possible (representing time periods); determined by the practical limitations of available computing power or some other limiting factor. These temporal divisions may correspond to whatever unit of time is most appropriate to the subject.

Datasets divided in the manner described above, into cells related to one another by two distinct but interrelated categories (latitude and longitude, for example), is referred to herein as cellular data. Each cell includes data relating to a plurality of categories, each of which is represented numerically, and each of which typically includes a data value for each discrete time period. Further information is stored in each data cell, associating that cell with particular classes of data. Typically, class data are stored in a binary 'yes'/'no' format, or as a value from a predefined list of possible values (i.e., rather than a numerical value).

Figure 6:
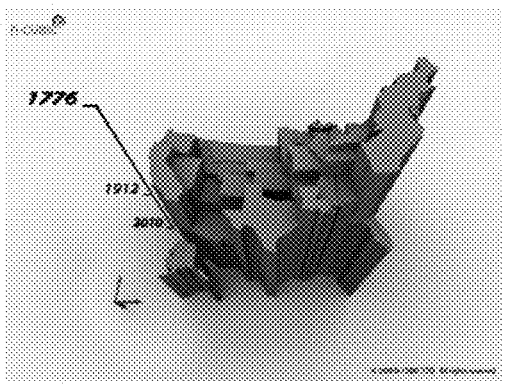
FIGS. 6 to 25 show various example visualisations of data that may be produced by the system of the disclosure.
Figure 7:
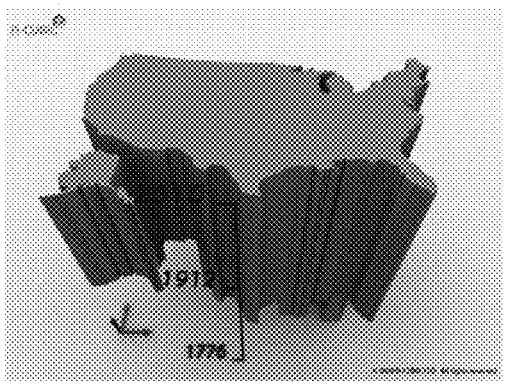

The example dataset contains historical data relating to the development of the US states over time. FIGS. 6 and 7 show visualisations of a model relating to the history of state accession in the USA. This is perhaps the most basic 3D visualisation type, which shows East-West longitude plotted on the x axis, against North-South latitude plotted on the y axis. In this way, a visualisation of a cartographical model may be produced, to represent a land mass. In FIG. 6, the z axis represents time, using a 'left handed Cartesian coordinate' scale, such that the year 1776 is in the foreground, and the year 2010 is in the background, of the model.

In this and the following examples, there are alternative ways in which data may be stored in order to generate the visualisations. For example, if the map of the USA is divided into cells to form a grid, data may be stored representing each grid point. Each grid point has a longitudinal value and a latitudinal value, so as to relate the cell to an absolute position on the map. Alternatively, each cell may be provided with data relative to its neighbouring cells.

Each cell may be associated with a single class of 'state', which may, conceivably, alter over time as state boundaries changed in history. So, in this example, each cell with a longitude and latitude falling within the boundary of Texas would be allocated the class 'Texas'. Of course, it is possible that a cell does not belong to the class "Texas" across all time periods, and therefore a list of data representing the class over discrete time periods may be stored in relation to that cell (as an array, for example). It will be apparent to the skilled user that there are many alternative ways to represent data of this kind, and it is envisaged that alternative methods may be used in addition to or instead of those methods described.

Each cell may also be provided with data specifically relating to the year of accession, to the USA, for example. This may be a numerical value representing the date of accession, or could alternatively be a series of binary ('yes'/'no') values defining whether the cell had acceded to the USA at each one of the discrete time intervals for which data are recorded.

At a lower scale of detail, each data cell may represent a single state. This may be implemented when data storage space, memory, or processing power is limited, for example. In this instance, the data cells may store information regarding the shape and position of the state, which may include longitudinal and latitudinal data regarding the Northernmost point, or Western-most point of the state. In this way, a map of the USA may be put together using data stored for each state. This lower detail version of the dataset could be used in the case where the system is implemented on a handheld device with a lower storage capacity, slower processor and/or smaller amount of memory available.

In FIG. 6, left-handed Cartesian coordinates are used to observe the historical process; in FIG. 7, the default right-handed Cartesian coordinates are used. The model is constructed by arranging the cells in terms of their known positions, by x and y coordinates of each cell (or by state, as described above), in each plane orthogonal to the z axis. If, for a particular value of z, the cell or State in question had not acceded to the USA in that year, the cell is not displayed in the plane representing that year or discrete time period. In this way, a 3D model is constructed, showing the manner in which States acceded over time.

The visualisation of the model displayed in FIG. 7 provides less easily visible information to the user, since the model is presented with the most recent time period in the foreground (in which all states have acceded). In this case, each cell or state in the plane is shown, thus obscuring the cells in planes representing earlier time periods. However, in another context, such a visualisation may provide more, rather than less, data to a user. For example, in relation to a dataset describing the fall of the Roman Empire, in which territories left the empire over time, the decreasing land mass could best be shown using a similar visualisation with later years shown at the front of the graphical representation.

Where the z axis represents time and the user examines a 3D form "from the past" (that is, lower z value to higher z value), left handed (or negative) coordinates are best used: where the user examines the form "from the present or future" (higher z value to lower z value), right handed (or positive) handed coordinates are best used. This can be changed by the user, or may be set to change, automatically, so that the x axis 'flips' (i.e., the axis is inverted) when the form is turned beyond a certain angle.

Different classes (or sub-objects) can be represented by different colors, or patterns, which can be assigned and changed by the user, for clarity. These will relate to specific areas, geographic or otherwise, and in this case, the state classes can be represented by color.

Figure 8:
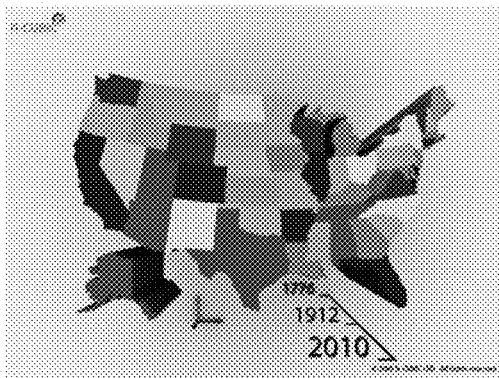
Figure 9:
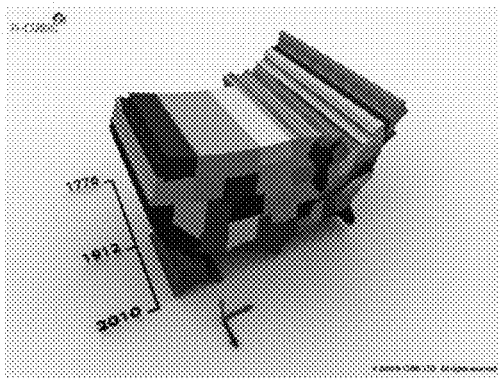

FIGS. 8 and 9 show a modified version of the visualisation of FIG. 7, wherein each state, or each set of data cells belonging to the same class (as classified by 'state'), is color-coded. In this way, data represented in 3D space may be classified into sub-categories, such that for each cell in the dataset, four types of information are displayed for each discrete time value: latitude, longitude, state, and whether that state (or individual cell) had acceded to the USA by that time period.

Figure 10:
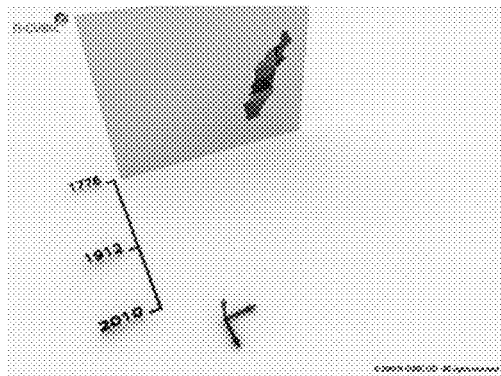

FIGS. 10 to 13 demonstrate the effect of varying the extent of the z axis range of the visualisation of FIG. 9. The visualisation of FIG. 10 shows only cell data having a z axis value equal to the year 1776, which has the effect of taking a 'slice' from the original model, to show a cutaway of the data matching that particular value.

Figure 11:
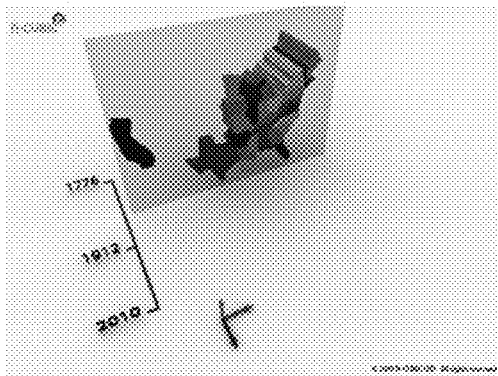
Figure 12:
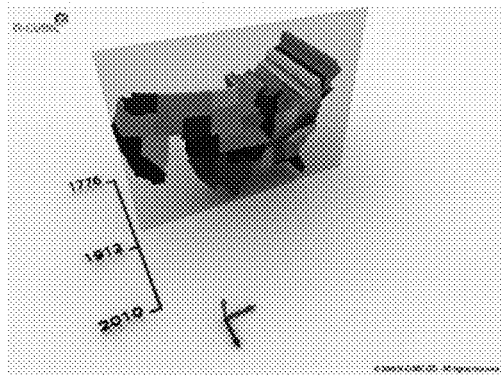

FIG. 11 shows a similar example to FIG. 10, wherein the cell data are only made visible for z axis values in the range from 1776 up to some greater value of z. Again, in FIG. 12 the range of z axis values displayed is extended to a yet greater value.

Figure 13:
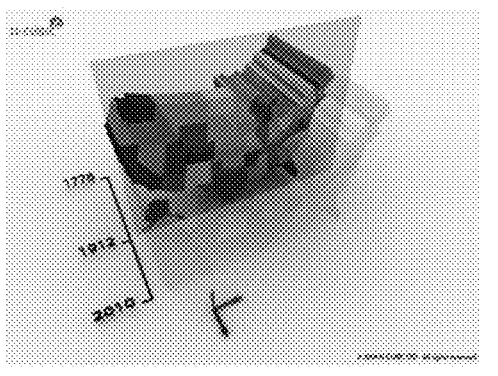

FIG. 13 shows an alternative view of the model, wherein the visualisation displays cells with z axis values between 1776 and 1912. All cells with z axis values greater than 1912 are also displayed (subject to the other criteria for display in the model being met; in this case the cell or state having acceded to the Union by the given value of z), but are rendered with a degree of transparency on the visual display, thereby allowing a user to view clearly the time period of particular interest (i.e., the year 1912), whilst seeing the full visualisation for all z values.

FIGS. 14 to 25 illustrate an example of how additional data categories, other than classes (i.e., a numerical value, for instance, rather than purely a 'yes'/'no' data value) can be displayed in conjunction with the standard 3D visualisation.

Figure 14:
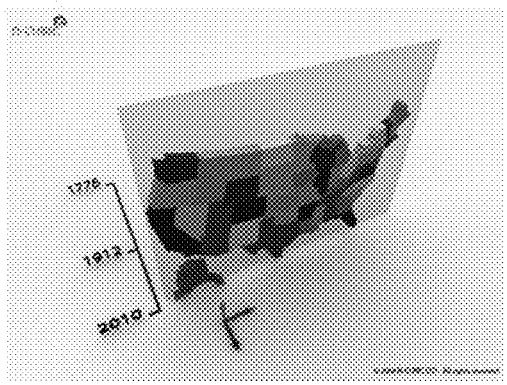

FIG. 14 shows a visualisation with cells having time values between the years 2000 and 2010 represented along the z axis.

When grouped by class (i.e., those belonging to each state), the cells in the model provide each state with an 'area' in terms of land mass, which equates to the relative number of cells in each class (for a given time, for example). Alternatively, where each state is stored as a single cell, the area of the state may be recorded as a separate category of data. In either case, a user may choose to represent the area of the state as a single dimension, to be plotted along a single axis, rather than in terms of longitude and latitude of the state. This manipulation of a visualisation of a model, to convert the representation of two categories so as to represent them as a combined single category, is referred to herein as 'folding' the visualisation.

Of course, this link between categories of data, which allows two data categories to be 'folded' into a single data category, is not limited to the categories of longitude and latitude. The skilled reader will appreciate that there are other data types which are correlated to the extent that mapping two such closely related categories onto a single combined category gives a meaningful combined value, and it is envisaged that the system of embodiments of the current disclosure is suitable for folding any suitable data categories.

For example, a visualisation in which 'area' and 'population density' of each of a number of classes are represented on two of the axes, may be 'folded' to produce a visualisation in which the 'area' and 'population density' values are represented by a single 'population' value for each class, on one axis only. In this way, a proportion of the original data are maintained as the dimensions of the visualisation are reduced, so that a further category can be represented on the redundant axis.

Further examples of pairs of related categories which may be 'folded' in this way include 'financial risk' and 'financial return', which can be represented on a single axis as 'information ratio', and 'volume' and 'no. of molecules' which can be represented as 'concentration', for instance.

Figure 15:
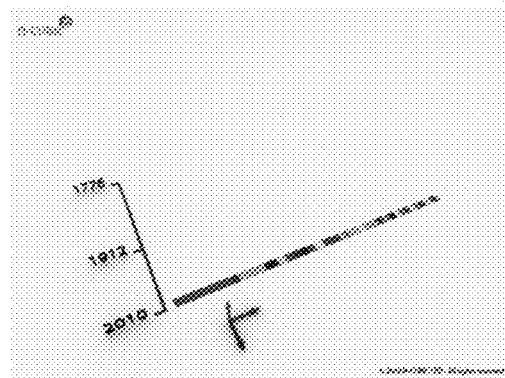

FIG. 15 shows a revised representation, wherein the x and y axes which previously represented the longitude and latitude of each cell, respectively, have been folded in the manner described above. The y axis of the visualisation of FIG. 15 is 'blank' (i.e., no data category is represented on the y axis). The x axis represents the area of each state, so that each area is displayed as the width of the respective strip extending over time in the z dimension.

Figure 16:
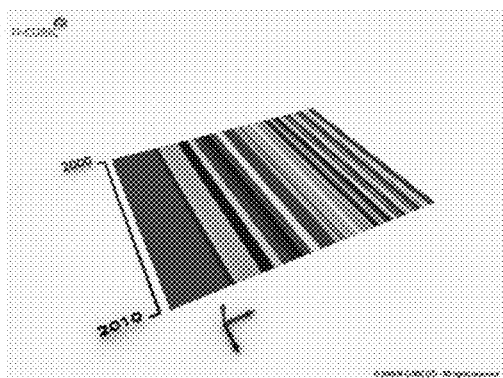

FIG. 16 shows the same general representation as FIG. 15 but with the z axis rescaled to allow the user to examine data within the selected time period in greater detail. It will be understood that such rescaling of axes may be performed on any of the axes of the visualisation, as selected by the user.

Figure 17:
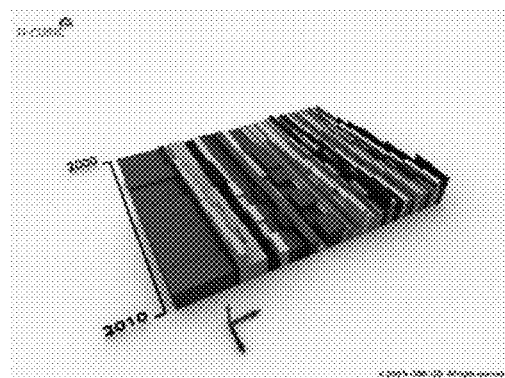

FIG. 17 illustrates the addition of a further data category, such that population density is displayed on the y axis of the visualisation. In this instance, with population density represented on the y axis, and area represented on the x axis, it is clear that the cross-sectional area (orthogonal to the z plane) of each strip represents the population of that respective state.

Figure 18:
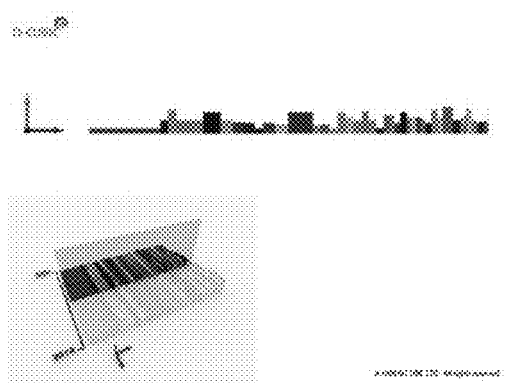
Figure 19:
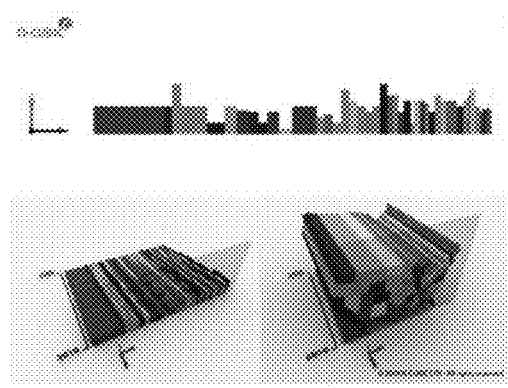

FIGS. 18 and 19 show different cross-sections revealed as different time values are selected on the z axis. A separate visualisation of the model, showing a 2D cross-section of the model for a given z value may be shown alongside the 3D visualisation. A user may scroll back and forth through the 3D visualisation, selecting different z values, which in turn generates a different 2D visualisation to represent the cross-section of the model at each respective value.

In FIG. 19 an additional 3D visualisation is provided, showing the land mass of each state plotted on the x and y axes, against time. As the user chooses different z values to examine in the original visualisation, the additional 2D and 3D visualisations are updated to display further data to the user, relating to each z value. This allows a user to view multiple data categories in visualisations displayed alongside one another, and to interact with them simultaneously, to allow patterns and trends in the data to be identified and observed within the same display.

Figure 20:
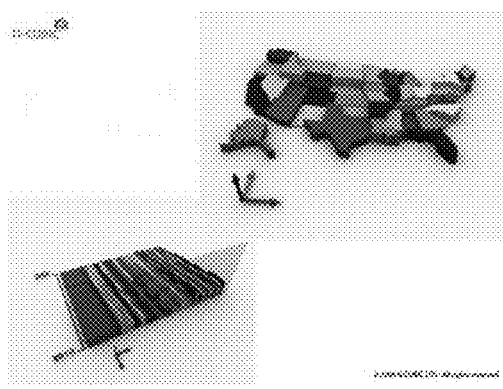

FIG. 20 shows a pair of related visualisations. The lower visualisation displays state area along the x axis, plotted against population density on the y axis, and time on the z axis, as in previous figures. The year 2010 is selected, as illustrated by the shaded field in the plane orthogonal to the z axis at the value 2010. The upper visualisation shows a corresponding projection in which the x and y axes show the land mass (i.e. geographic area) of each state, and the z axis shows the population density values, for the year 2010, as represented by the y axis in the lower visualisation. In this example, therefore, the volume of each state in the upper model represents the population of the state at the given point in time.

Figure 21:
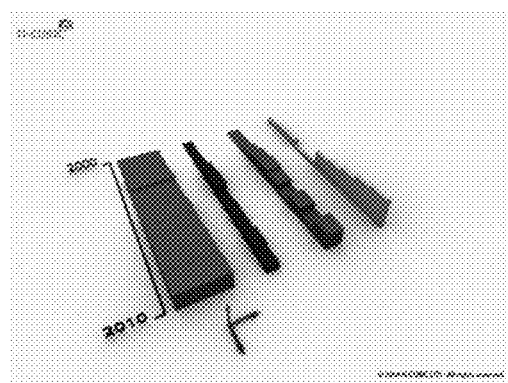

FIG. 21 shows a visualisation in which four states have been selected and isolated, in order to enhance clarity and for ease of comparison. A user is able to choose individual data classes, such as a state, for example, by selecting and highlighting that class within the visualisation. The user may then choose to focus the graph solely on data of that particular class, or a range of classes.

In another embodiment of the disclosure, a user may select cells within the data set (for example, areas of a 2D map of the USA) or highlight a boundary of an area within an image of the dataset, so as to define a class within the data. In this way, the user may define classes to allow the modeling of any subset of the data.

Figure 22:
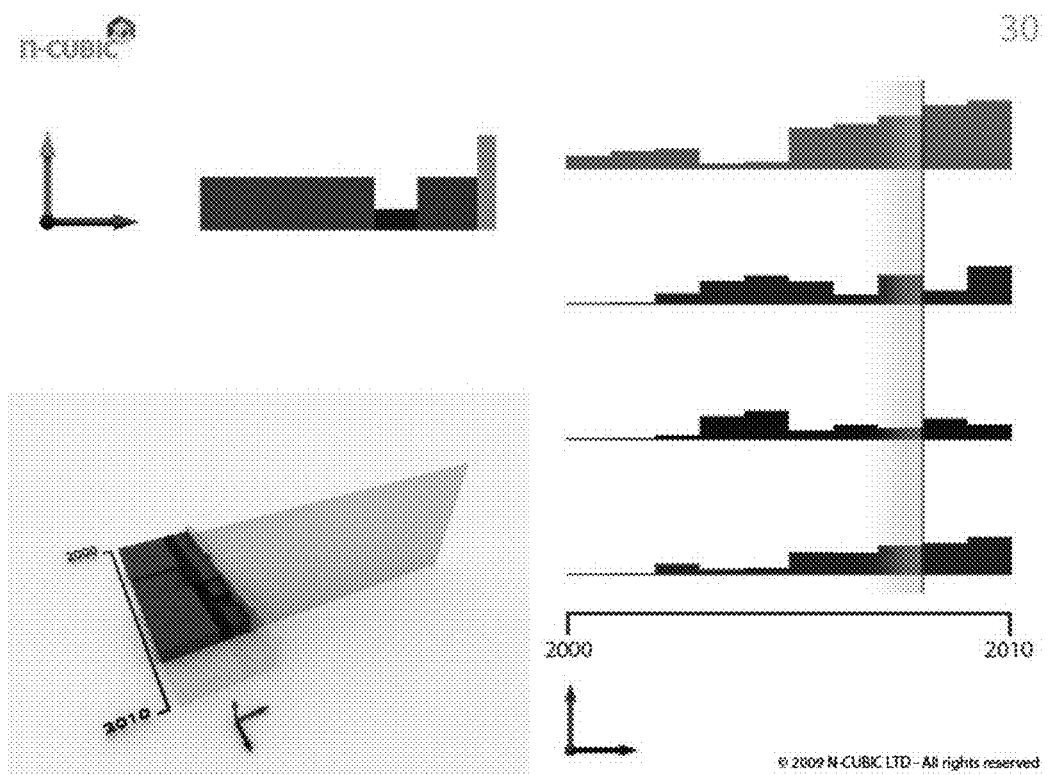

FIG. 22 shows a visualisation (bottom left) displaying the population density (on the y axis) of four states, plotted against area (on the x axis) and time (on the z axis). A first projection of the model (top left) shows the orthographic view of the x and y axis cross section for a given value of z, which is indicated by the plane orthogonal to the z axis in the original visualisation. A second projection (right) shows an orthographic view of the z and y axes, depicting the changing population density (on the y axis) of each state, over time. Again, the selected value of z is visible in this view.

The user may change the selected value of z, which in turn fundamentally alters the first projection, as a different cross-section is used. The second projection alters to indicate the revised value of z that has been selected, although the visualisation otherwise remains unchanged.

Figure 23:
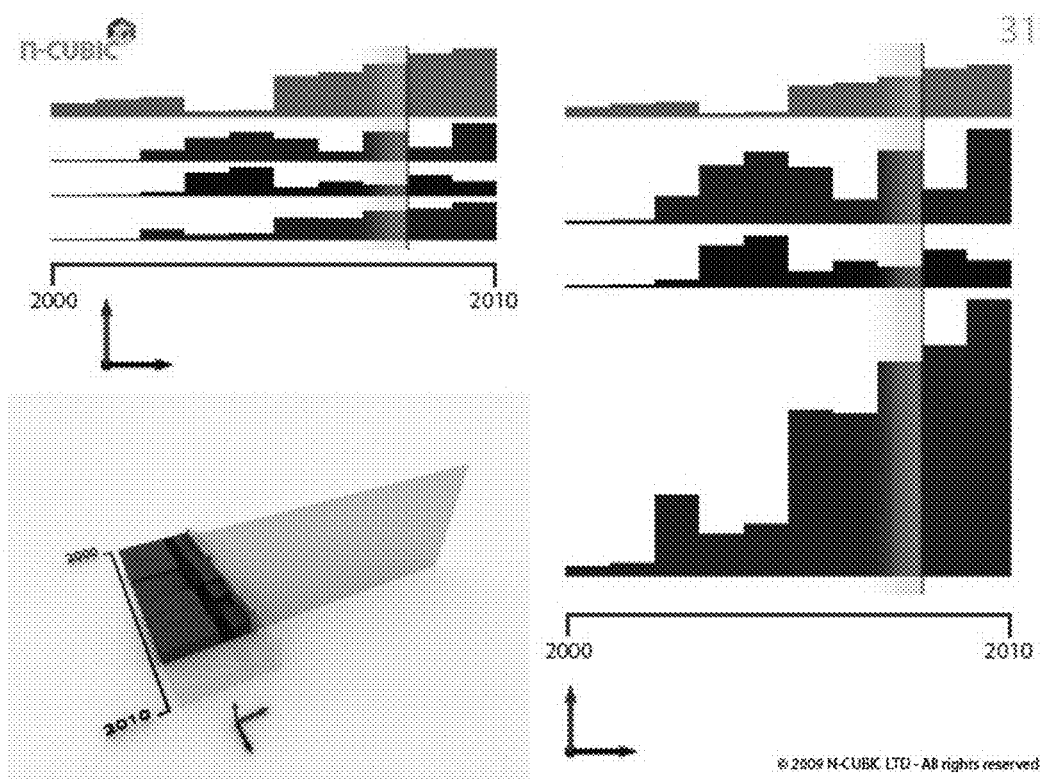

FIG. 23 shows a visualisation of the same data as that shown in FIG. 22, with a similar set of projections. In this case, the first projection (top left) has been replaced to show a histographic view of the population densities of the states, plotted over time. The second projection (on the right) shows a different orthographic view of the total population (on the y axis) of each state, over time.

Figure 24:
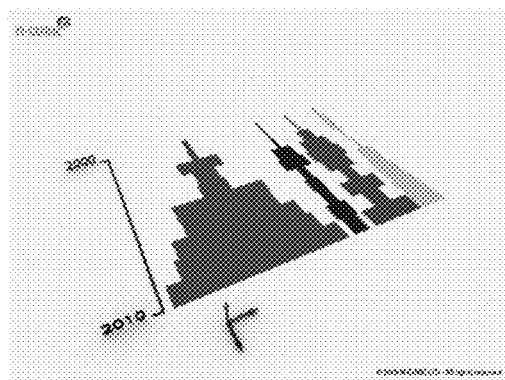

FIG. 24 shows a visualisation of the same population data as shown in the second projection of FIG. 23. In this view, the 2D shapes have been rotated through 90 degrees so that the population of each state is now shown on the x axis, and centred along its own centreline.

Figure 25:
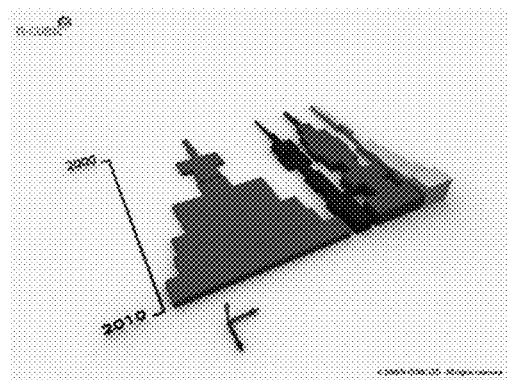

FIG. 25 shows a visualisation which is similar to the visualisation of FIG. 24, wherein average wealth per capita data has been plotted on the y axis, to create a 3D visualisation.

The above examples demonstrate the type and variety of visualisations that may be created, and displayed, to represent data from a model using the system. We now describe, by way of example, a user interface which allows a user to interact with, and to edit, the visualisations displayed.

Figure 26:
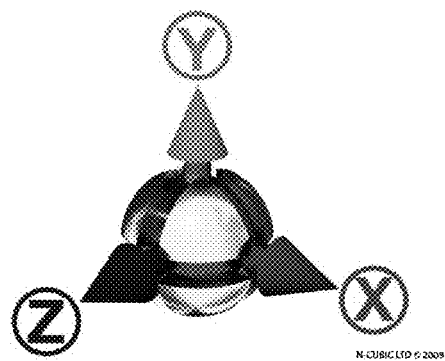
FIGS. 26 to 37 show elements of the user interface of the system according to the disclosure.

FIG. 26 shows a user interface comprising a representation of a spherical ball, with a 'pointer' arrow projecting from the ball in the directions of each of the three axes of a visualisation. Each pointer bears the letter corresponding to the axis it represents.

Figure 27:
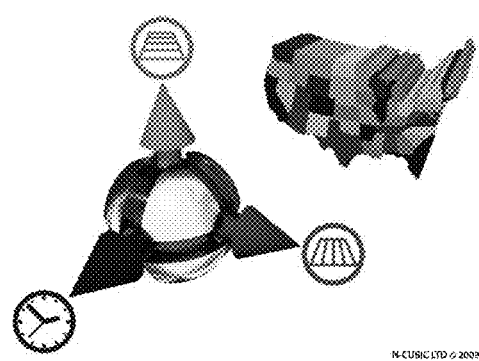

FIG. 27 shows an example visualisation, wherein the x axis represents longitude, the y axis represents latitude and the z axis represents time. The user interface provides pointers labelled with generic 'latitude', 'longitude' and 'time' symbols, accordingly.

Figure 28:
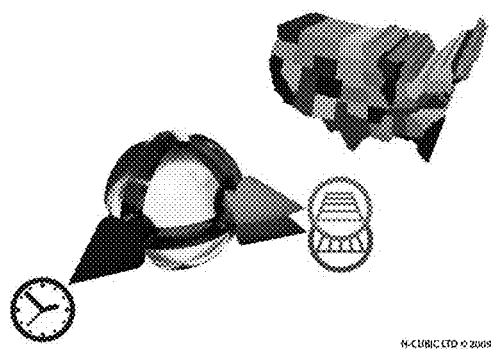
Figure 29:
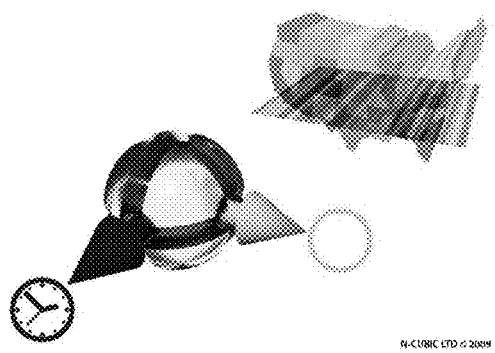
Figure 30:
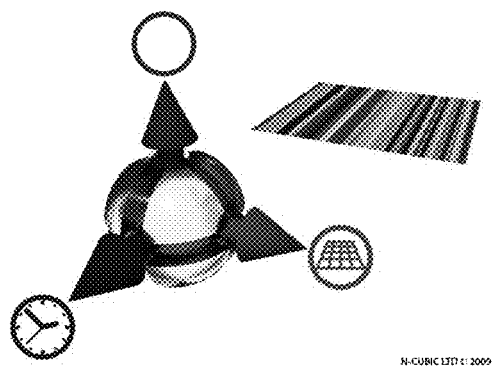

FIGS. 28 to 30 illustrate how the 'folding' process may be performed by a user, to manipulate the visualisation so that two of the dimensions are folded to a single dimension, as described above.

To initiate this manipulation, the user interacts with the system using the user input device, and selects (by clicking with a mouse, touching on a touch screen, or by any other means) a pointer—in this case the y axis pointer representing latitude—and drags the pointer onto one of the other pointers—in this case the x axis pointer, representing longitude. The system calculates the folding process, which in this case involves converting the longitude and latitude categories to a single area category. FIG. 30 shows the converted visualisation, in which the 3D visualisation of area (in 2 dimensions) against time has been converted to a 2D visualisation representing area (as a single value) against time.

Figure 31:
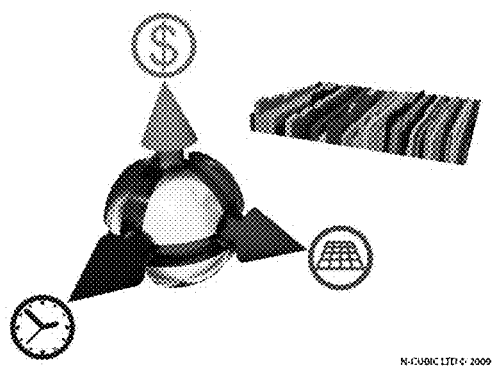
Figure 32:
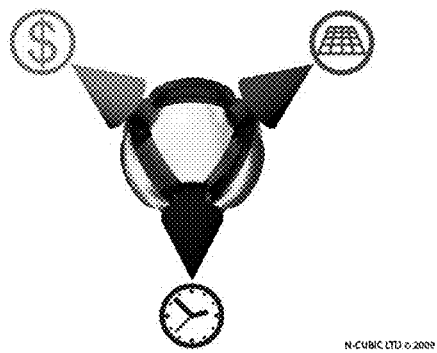
Figure 33:
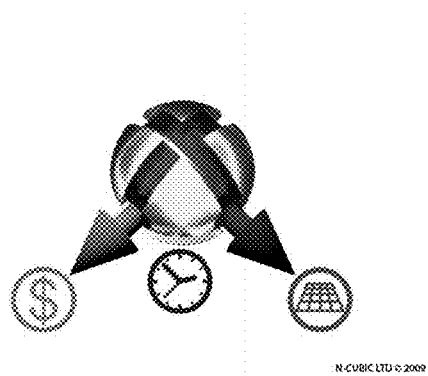
Figure 34:
Figure 35:
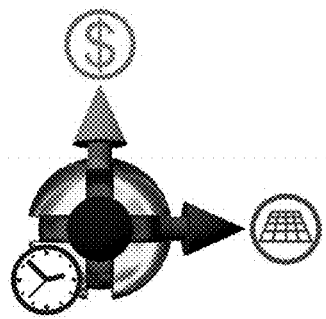
Figure 36:
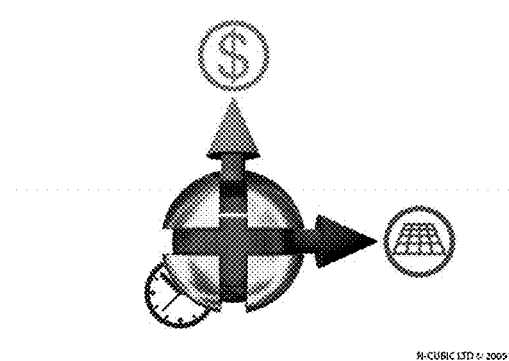
Figure 37:
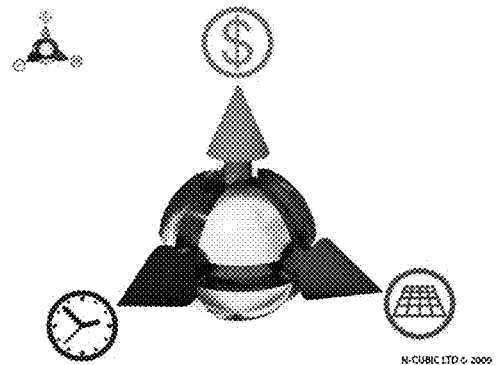

FIG. 31 shows a further converted visualisation, in which the user has selected the 'blank' pointer of FIG. 30 (again, by clicking with a mouse, using the touch screen, or the like)

and chosen a category to be represented on that axis. In this example, the user has chosen income per capita (represented by the dollar sign) to be represented on the y axis, which creates a 3D visualisation accordingly.

FIGS. 32 to 37 show how the user interface indicates directionality, even when one pointer is not in view. The user may alter the directions faced by each of the axes, by selecting the ball itself, rather than a pointer, and dragging it so as to cause the ball to rotate. Doing so rotates the visualisation, and each of the three axes remains orthogonal to the other axes, so that the visualisation maintains its overall shape. To create a 2D visualisation of a model, the user simply rotates the ball until one of the axes faces directly outwardly, or inwardly, from the display. This obscures the axis from view, displaying the remaining two axes as a 2D visualisation.

The user interface also retains its functionality when very small, although a stylus may be used for touch screen manipulation in this case.

To increase or decrease the scale of an axis of the visualisation, the user may select the corresponding tool provided on the user interface, for the respective axis. In a further embodiment, where a touch screen display is used, the user may touch the screen at two positions using two fingers in alignment along the subject axis, and either move his fingers apart, or together, to increase, or decrease the scale of the axis, respectively. Alternatively, scaling of an axis may be achieved by touching the pointer of the relevant axis, and the symbol associated with the category of that pointer, and either dragging those points away from, or towards, one another to either increase, or decrease, the scale of the axis, respectively.

Transparency can be used to aid the user when selecting data, or classes of data, from the visualisation. Using transparency, areas of the visualisation may be shaded out, enabling the user to see more clearly the areas he is selecting. For example, transparency may be used to indicate which z axis value is being selected when bisecting a graph, to produce a cross-section of the x and y axis values at a given point. Areas with a higher z value (i.e., towards the front of the display relative to the point selected) can be made partially transparent, so that regions of the visualisation at the selected point are visible to the user.

An example of this might be a comparison of two base level 3D forms; one depicting the spread of a certain mitochondrial DNA pattern through time and space, the other depicting the spread of a language or linguistic group through the same time and space. In order for each to be visible, each would be transparent by default: where the two overlap, there would be solid color. However if co-existence was expected, then anomalous instances where one was present without the other could be highlighted with a glowing or pulsating color. They could then be selected, isolated and examined.

As a high or very low transparency may be hard to see, the user can select to highlight the edges of one or more objects with solid color. This effect could be applied to every edge, or alternatively to a single value selection on one axis, to bisect the visualisation. This is particularly useful when applied to an object depicting the whole world, for instance. If the object in the visualisation is given an opacity level of 0%, and highlighted edges for a particular value defining a plane, bisecting the visualisation, the geographic location of any co-existent object, brought into the 3D space, is made apparent to the user.

Transparency is also another means by which an additional category of data can be represented in 3D space, without combining the value of two axes. For example, an opacity level of 100% could represent the highest population density and 0% (or a user determined, low value) could represent the lowest. As an alternative, a color gradient, or range of colors could also be used to the same effect.

For example, a scan of a human body could be modeled by the system. The z axis scale could represent body height, wherein the region with negative values of z, to one side of the bisection plane (at which a cross-section of the model is formed) would depict the part of the body already scanned, and the region having positive values of z would form a topography representing density. Heat distribution could be represented by the conventional color scheme. The two forms of representation could be inversed, at the user's discretion.

The plane between the region of the body already scanned, and the remaining region, could be represented by a projection of the cross-section formed at that plane. A second projection of a plane could be used to select and isolate topography relating to heat and/or density, above a selected minimum value. A third projection of a plane could be used to determine a maximum value. Therefore, all matter of a given density and/or temperature could be isolated and examined; within spatial and temporal contexts.

It is further envisaged that the dataset may include data relating to 'events' which occurred at a particular time and location in history. For instance, the event may be an eruption of a volcano in a particular cell, or a battle taking place in a model representing a historical war. This data may be represented within a data cell by a time-referenced list, such that when data relating to a particular discrete time interval is viewed in the visual representation, a visual flag is displayed in the representation of the data, representing that an event occurred in that location at that time. Of course, the event may not be linked directly to a location, as such, and may be displayed in relation to a particular time whether or not geographical properties form part of the visual representation.

By way of example only, described is a method for creating and storing data representing sub-objects, or classes, within the dataset. Each sub-object may, for example, be defined by parameters including: Object Name, Object Code, Map Type and Dimensional Values. Sub-objects may be further defined by parameters such as Author Name and Creation Date.

Each model is a group of sub-objects having a shared Object Name, Object Code, and Map Type.

The Object Name may refer to the subject of study. The Object Code allows multiple objects of the same name, to be compared with each other. The map type refers to the manner in which the area (x,y) map is reduced to a single (by default x) axis. There is no theoretical limit to the dimensional values, which begin with the object's west/east location, its south/north location and its position in time.

The first three values will initially correspond with the x, y and z axes, until the user changes this. For example:

```
ObjectName:MapUSA;
AuthorName:JohnSmithUniversityDeptGeography;
ObjectCode:########;
MapType:Political;
EastWest=########;
SouthNorth=########;
Time=########;
PopDense=########;
```

```
    WealthPerCap=########;
    x=EastWest;y=SouthNorth;z=Time;
```

If the user 'folds' the x and y axes to create a single 'area' value on the x axis, the following change is made to the object:

```
    ObjectName:MapUSA;
    AuthorName:JohnSmithUniversityDeptGeography;
    ObjectCode:########;
    MapType:Political;
    EastWest=########;
    SouthNorth=########;
    Time=########;
    PopDense=########;
    WealthPerCap=########;
    x=EastWest*SouthNorth;y=<blank>;z=Time;
```

If the user then decides to add Population Density as a category of data on the y axis, the object changes as follows:

```
    ObjectName:MapUSA;
    AuthorName:JohnSmithUniversityDeptGeography;
    ObjectCode:########;
    MapType:Political;
    EastWest=########;
    SouthNorth=########;
    Time=########;
    PopDense=########;
    WealthPerCap=########;
    x=EastWest*SouthNorth;y=PopDense;z=Time;
```

The various map types differ in their behaviour when the user chooses to combine the map data into a single axis. Map types include: Political, Landmass, UserDefined, and Neutral.

When the Political map type is reduced to a single axis, all states' political boundaries appear as contiguous stripes, where the width of each stripe is determined by the area of the class in 2 dimensions (or an equivalent unit). When the Landmass map is used, similarly, the various continental landmasses appear as contiguous stripes. The user can then select non-contiguous objects, within those stripes, by color or object name and group them together into contiguous stripes.

The user can also specify and save a map type, using the UserDefined map type, choosing which areas of the world's surface will appear as contiguous stripes when reduced to a single axis. In other words, the user may choose which classes of the data form the basis for map manipulation. In the example used throughout the description, the map type is Political, and state boundaries are selected as the class type.

If the map type is specified as Neutral, no areas of the world will appear as contiguous stripes: the user will simply select objects by color or object name, then group them together into contiguous stripes, as desired.

Another visualisation which may be selected by a user is the so-called 'Tree' visualisation, in which data which are related in a non-spatial manner (e.g., hierarchical) may be represented.

Trees of this nature may be used to describe phylogenetic relationships between living organisms or the conceptual relationships between cultural, economic, political and religious phenomena. The user is able to switch between or compare views depicting an object's conceptual or phylogenetic relationships to those depicting their positions in time and space.

By way of example only, the following shows how a Tree description may be added to a data type describing the class of human beings.

```
    ObjectName:Homo_sapiens;
    AuthorName:JohnSmith;
    ObjectCode:########;
    MapType:GeoLand;
    EastWest=########;
    SouthNorth=########;
    Time=########;
    PopDense=########;
    x=EastWest;y=SouthNorth;z=Time;
    Tree:LifeOnEarth/Eukaryota/Opisthokonts/Animalia/Bilateria/
    Deuterostomia/Chordata/Craniata/Vertebrata/Gnathostomata/
    Teleostomi/Osteichthyes/Sarcopterygii/Terrestial_Vertebrates/
    Tetrapoda/Reptiliomorpha/Amniota/Synapsida/Eupelycosauria/
    Sphenacodontia/Sphenacodontoidea/Therapsida/Mammalia/
    Eutheria/Primates/Catarrhini/Hominidae/Homo
```

Although the Tree data are single parameters within the description of the sub-object, it is a sequence of group names in hierarchical form. These group names are references to objects (or groups of objects) having the same name, each with their own descriptions and Tree definitions.

In all of the representations of the Tree, color coding can be used on different parts of the tree to enhance clarity and/or to correspond with the subject's color in the main 3D visualisation within the system. Parts of the tree may be selected, by name or color, isolated and examined.

Whereas different life-forms may each have only one lineage, cultural, economic, political and religious phenomena may have multiple antecedents. In order to represent convergent lineages, an object can have multiple sequences of group names. Where this is the case, each of these sequences has its own sequence name.

As outlined above, in its simplest form a tree may be displayed in a conventional 2D representation. Here the 'base' (or 'trunk'), displayed on either the left or bottom of the visualisation, represents the earliest point in time. The furthest part of the tree from the base, to the right or the top-most part, respectively, corresponds to the most recent point in time being represented.

The length of the tree relates, directly, to the z values in the main part of the visualisation. This enables comparisons to be made with any manifestation of the subject's data in the standard 3D visualisation.

No x or y values are displayed: the spacing between the various branches of the tree, at right angles to its length, serves to separate them for purposes of clarity. Thus, the branches of species diverging from a shared genus may be depicted as branches of the tree, separating over time, wherein the distance between the branches does not describe any relationship between the branches, and serves to display data more clearly to a user. Alternatively the spacing between branches over time could be used to indicate a relationship between the two diverging species, such as genetic variation, for example. In this way, a further data value is displayed to a user, representing the relative values of the two branches.

As another example, data representing the growth in income per capita in each of three US states may be modeled against time, wherein the data are displayed in a 2D tree form. The point 'zero' on the time scale is represented at an inner circle, and time is represented radially outward from the inner circle (which, if the income per capita of each state at the initial time was zero, could form a central point rather than a circle). Income per capita may be represented as the width of the line over time (i.e., the 'circumferential' width, as the line extends radially outwardly from the centre), and the angular position of the line representing each state may be arbitrary.

In this way, meaningful data are displayed against two scales, but an abstract scale may be used for the angular positioning of each line which represents data that is not spatially related.

As an alternative, the same data could be visualised in a similar way as that described above, wherein the relative angular position of the line representing each state forms an angle, clockwise from North, to indicate relative landmass of each of the states. Alternatively, the absolute values of longitude of each landmass could be represented by angular positions. In either case, the angular position scale is not abstract, as the relative or absolute positioning of the lines conveys additional data to a user.

In a further embodiment, the Tree may occupy a virtual cylindrical space. There is no great conceptual difference between the 2D Tree and the 3D Tree: the length of the tree may relate, directly, to the default (time) z values in the main part of the system and there are no x or y values; the spacing between the various branches of the tree and their positions within the cylindrical space, serving to separate them for purposes of clarity. Alternatively, the x and y coordinates could be used to represent values of data within the model, such that the positions within the cylindrical space represent relative or absolute values of the branches.

The 3D Tree has the advantage of being able to be examined end on, like an object in 3D space. A period of time, within the tree's history, can be isolated and examined. This is especially useful when comparing such a selection with its equivalent object in the standard 3D visualisation.

In a further embodiment of the 3D Tree, the Tree visualisation may be linked to the standard 3D geographic visualisation, for instance. As with the previous embodiments, the length of the tree relates, directly, to the default (time) z values in the main part of the system. In this case, the x or y values of any map type are represented as points on the virtual cylinder's circumference. In other words, an area of a political model correlates directly to a portion of the circumference of the cross-section through the cylinder. Were the virtual cylinder to be "unrolled" flat, it would be identical to the x and z axis values of the subject's object, where x represents area and z represents time.

This allows for the direct visual connection of the Tree to the standard 3D visualisations of the system; either by 'wrapping' x and y values around the outside of the 3D Tree's virtual cylinder or by distorting the tree so that it connects to an object in the 3D visualisation.

In a further embodiment, a Funnel Lens Tree visualisation may be created. This visualisation is particularly useful for the representation of the phylogenetic tree as, with the exception of the major extinction events, there has always been roughly the same number of species existing on the planet at any one time.

Figure 38:
Figure 39:
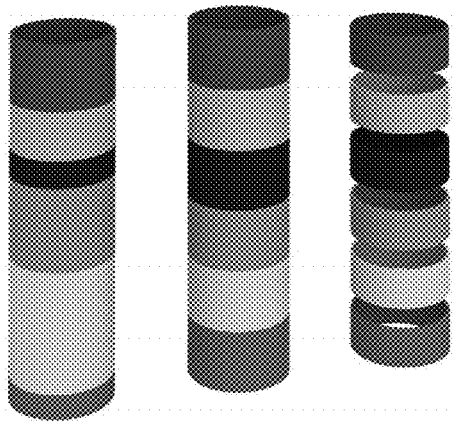

FIG. 38 illustrates a way in which data from separate classes may be visualised in an abstract form. In the example shown, the relative land mass of each of six continents is modeled as a cylindrical visualisation, in which each continent is represented by a band having a width (i.e., lengthways of the cylinder) proportional to its relative land mass. FIG. 39 illustrates that a cylindrical visualisation may be modified to normalise the data modeled on the z-axis. Rather than representing a data set such as land mass, the z-axis may represent time (each band of the cylinder has the same width and therefore represents data modeled over the same period of time), or may alternatively have no data value (i.e., the width of the band is set to a default width).

Figure 40:
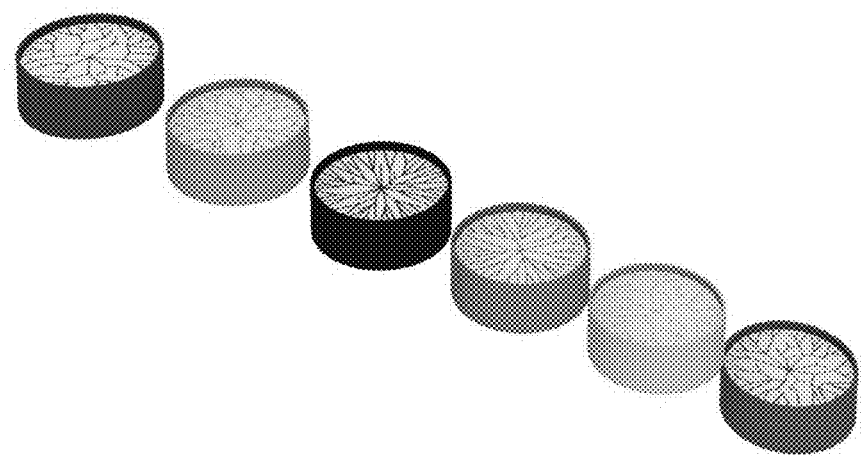

FIG. 40 illustrates the Funnel Lens Tree visualisation, applied to each of the bands. A user may select individual ones of the bands in order to view them in more detail. Each of the bands provides a visualisation in which data is represented by radial branches, in a standard tree model. These conventional trees could represent family trees, phylogenetic relationships or even diverging philosophies or religions. The centre of each tree is the point of origin, or the earliest time studied. The periphery of the band represents the latest point in time, so that the radial spacing of a point from the centre of the band represents a specific point in time. The data set being modeled may have many 'branches' which diverge or combine between the centre and the periphery. However, the complexity of the dataset being visualised may be similar at the origin to that at the periphery, in terms of the numbers of separate branches to be visualised. Of course, towards the centre of the band it is not possible to show a large number of branches, or the interaction between those branches, since the origin is a single point. Therefore, although time is represented radially from the centre of the band, it can also be represented along the length of the band (i.e., the z-axis), so that a user may 'zoom' in towards and out from the centre of the band, giving the appearance of moving up and down a funnel (thus the term 'funnel lens tree'), so as to see greater detail of the branches displayed at the earlier times.

In embodiments, the time scale may be reversed, so that the latest time is represented at the centre of the tree and the periphery of the tree represents the earliest time.

Figure 41:
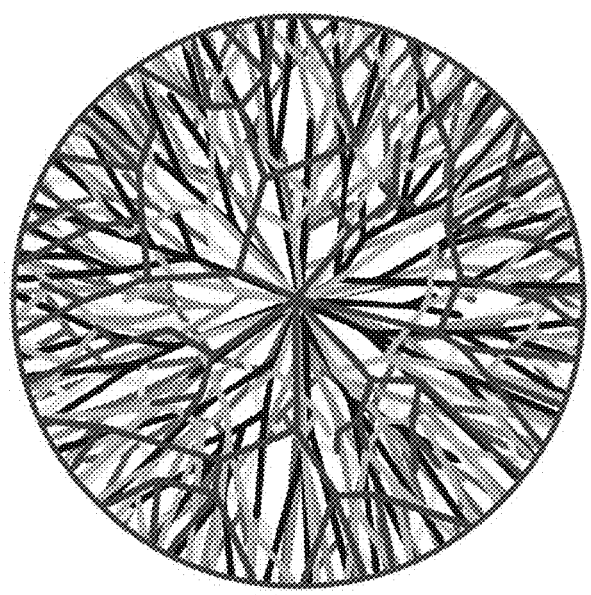

FIG. 41 shows a view of data belonging to the multiple classes (those depicted in FIG. 40) wherein the classes are overlaid so that the tree representing each of the continents is viewed as a single tree. FIG. 42 illustrates that various points of the visualisation—which may occur at junctions between branches or at any point along the length of a branch—may be highlighted and/or 'tagged' to record a particular event that occurred at a point in time. For instance, if representing a family tree, a branching point may indicate the birth of a child, in which case information may be provided about that child, or the date and location of birth, for example. These tags may be provided with a dataset that is being viewed by a user (usually with a magnifying tool). Additionally, or alternatively, a user may select points on a visualisation with which to associate particular events or information that is input by a user and saved to the dataset.

FIG. 43 provides an example of how a user may 'zoom in' to the central region of the funnel lens tree visualisation in order to view the branches in greater detail. The most central region of the tree may in fact be represented as a ring, wherein the separation between classes or types of data may be visualised. In this example, the left hand image of FIG. 43 shows the evolution of a species in North America between 1760 and 2010. The right hand image shows the funnel lens view of the data representing the time period 1900 to 2010.

So, for example, a model representing the development of species over time might involve branches extending outwardly from the central axis of the cylinder, towards the edge of the cylinder, having the appearance of extending in a 'forward' direction along the z axis. In this way it appears that time is represented on the z axis, whereas in any particular view of the tree, the time is represented radially.

Where subspecies appear within a genetic group, a branch separates into two distinct branches, at the associated radial position corresponding to the point in time where the new genetic subspecies first appeared. The specific angular position, either relative or absolute, may serve simply to show separation between branches so that the branches may be viewed more easily by a user, or else may serve to represent actual data values such as genetic separation or (less often) geographic location of species, for example. In this way, the emergence and genetic separation or similarity of species, over time, may be visualised.

In order to de-clutter the visualisation so that a user may view the data more easily, the number of branches representing, for example, species which became extinct over a time period in question may be reduced. In an embodiment, branches that 'end' prior to the latest time value of the visualisation (i.e., the species became extinct), are culled from the visualisation. In this way, only 'current' species and their evolutionary predecessors may be represented in the visualisation.

At any given point within a band of the visualisation, the complexity may be great, in terms of the number of classes being represented. Therefore, progressively less detail is shown the closer to the centre. For this reason, and because the function of the Funnel Lens Tree is to display high levels of complexity, there are various methods of enlarging portions of the model to see otherwise hidden levels of detail.

First, a user can zoom in to view hidden detail using a conventional zoom tool, where the whole display window zooms in, narrowing the view of the display to a small portion of the visualisation.

Second, the user can use a magnifier panel to view a portion of the visualisation in higher detail (as in FIG. 42).

Third, the user may use a "Funnel Lens", whereby the user is able to decrease the period of time displayed between the point of origin and the outer circumference, thus increasing the level of detail shown. This is achieved by either, or both, lowering the time value depicted at the edge of the circle and/or increasing the time value at the point of origin (as in FIG. 43).

The use of these three methods of increasing the detail of the model enables the user to see both the full visualisation, and the details, at the same time.

The modeling capability of the current disclosure has been described in terms of an example showing the development and union of the United States, the evolution of species, and various other examples. It will be apparent to the skilled reader that the system is also capable of representing myriad other forms of dataset, including, but in no way limited to the following further examples.

An embodiment of the model could be used to represent the evolutionary development and population of species, over the surface of a continent, or across the surface of the planet. In this instance, the planet surface may be divided into a grid of cells, each storing data about the existence, or population, of each species within the area of land or sea defined by the cell over each discrete time interval being represented. In this way, the user may use the interface to examine the evolution and movement of species over time, choosing particular species to be represented as classes in isolation, or choosing various areas of the grid to view separately from the other data.

Similarly, the same dataset could be represented using a Tree model, such that each species forms a branch of the tree, represented in relation to time. The thickness of the branch may indicate the population of the species, which the position in relation to the circumference of the 'virtual cylinder' within which the 3D Tree representation is modeled, may indicate the location of the species in relation to the continents.

In addition to the data-modeling and graphical model simulation functionalities described above, the system may include editing functionality. In an 'editing' mode, a user may manipulate visualisations of data in order to change the underlying data. For example, data may be displayed to a user in graphical form, showing the relationship between a first and a second variable (plotted against and x and a y axis, for example). In an editing mode, a user may select data points, or lines plotted between data points, and manipulate the data either by dragging the selected point or line, or by inputting revised values for the data points (or gradient of curve, for example). This interaction allows the graphical model of the data to be amended by a user. The system may record the revised data values correlating with the revisions to the visualisation made by the user, and may store the revised data as a copies of the original data, create a revised version of the visualisation, or may overwrite the original dataset.

It should be understood that while the editing mode has been described with reference to a simple graph having two axes, it is envisaged that a user may edit more complex visualisations as described elsewhere in this description, in a similar manner.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the disclosure in diverse forms thereof.

The various embodiments described above can be combined to provide further embodiments. Aspects of the embodiments can be modified to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method of displaying virtual representations of data, comprising:
    at least one processor storing a dataset comprising a plurality of data cells, each cell comprising data values associated with a plurality of categories;
    at least one processor receiving from a user a selection of a plurality of categories, each selected category representing a category of data stored in a dataset;
    at least one processor displaying to the user a virtual representation of the dataset, each dimension of the virtual representation representing values of data in a respective category of data selected by the user;
    at least one processor receiving from the user a selection of a first and a second category of data displayed in the virtual representation;

at least one processor receiving from the user a command to combine the first and second categories of data;

at least one processor determining whether values of data in the first and second categories are suitable for combination to generate different values of data based on the values of data in the first and second categories, and when the first and second categories are suitable for combination:
- at least one processor replacing the first and second categories of data with a third category of data representing a mathematical logical combination of the values of data in the first and second categories to generate different values of data in the third category of data based on the values of data in the first and second categories;
- at least one processor displaying a revised virtual representation of the dataset, the revised virtual representation including a graphical three-dimensional object having data modeled over three axes of the three-dimensional object wherein a first axis of the three axes represents the first category, a second axis represents the second category and a third axis represents the third category, wherein the dimensions representing values of data in the first and second categories of data in the original representation are replaced with a representation of a third category of data representing a mathematical logical combination of the values of data in the first and second categories of data, wherein a dimension of the revised virtual representation representing the different values of data in the third category of data based on the values of data in the first and second categories replaces the dimensions representing values of data in the first and second categories of data in the original representation;
- at least one processor receiving input from a user indicating movement on a graphical user interface, by the user, of a pointer representing the first axis that represents the first category to a pointer representing the second axis that represents the second category;
- in response to the receiving input from the user indicating the movement of the pointer representing the first axis that represents the first category to the pointer representing the second axis that represents the second category, at least one processor converting the first and second categories to a single fourth category including a single value representing a mathematical logical combination of the first and second categories; and
- in response to the converting the first and second categories to the single fourth category, at least one processor changing, on the graphical user interface, the three dimensional object to a two dimensional visualization, showing the conversion of the first and second categories to the single combined fourth category.

2. The method of claim 1, wherein storing the dataset further comprises associating each data cell with one or more classes of data.

3. The method of claim 2, wherein the method further comprises:
receiving from the user a selection of a class of data;
displaying a different virtual representation of the dataset, wherein the different virtual representation of the dataset displayed to the user is restricted to data of data cells associated with the class selected by the user.

4. The method of claim 2, wherein the method further comprises:
receiving from the user a selection of a class of data;
displaying a different virtual representation of the dataset, wherein the different virtual representation of the dataset is of data cells associated with the class selected by the user and is differentiated visually from data of data cells not associated with that class.

5. The method of claim 1, wherein the method further comprises:
receiving from the user a further selection of a category of data displayed in the virtual representation;
receiving from the user a selection of a range of one or more values associated with that further selected category;
displaying a restricted virtual representation of the dataset, wherein the restricted virtual representation of the dataset displayed to the user is restricted to data corresponding to values within the selected range of values in the further selected category.

6. The method of claim 5, wherein displaying a restricted virtual representation comprises not displaying data representing the further selected category.

7. The method of claim 1, wherein the method further comprises:
receiving from the user a selection of a portion of the virtual representation of the dataset representing one or more data values;
receiving from the user a command to manipulate the portion of the virtual representation;
determining for each data value represented by the portion of the virtual representation a revised data value reflecting the manipulation made to the virtual representation in relation to at least one of the plurality of categories selected by the user; and
storing the revised data value.

8. A system for displaying virtual representations of data, comprising:
at least one computer processor;
a storage device, under control of the at least one computer processor, operable to store a dataset comprising a plurality of data cells, each cell comprising data values associated with a plurality of categories;
a visual display device; and
a user input device;
wherein, under control of the at least one computer processor, the user input device is operable to receive inputs from a user, and the display device is operable to display to the user a virtual representation of the dataset, in accordance with a computer-generated user interface for manipulating visual representations of data, the user interface operable to:
receive from a user a selection of a plurality of categories, each selected category representing a category of data stored in a dataset, the dataset comprising a plurality of data cells each comprising data values associated with the plurality of categories;
display to the user a virtual multidimensional representation of the dataset, each dimension of the virtual representation representing values of data in a respective category of data selected by the user;
receive from the user a selection of a first and a second category of data displayed in the virtual representation;
receive from the user a command to combine the first and second categories of data; and determine whether values of data in the first and second categories are suitable for combination to generate different values of data based on the values of data in the first and second categories, and when the first and second categories are suitable for combination to:
replace the first and second categories of data with a third category of data representing a mathematical logical combination of the values of data in the first and second categories to generate different values of data in the third category of data based on the values of data in the first and second categories;
display a revised virtual representation of the dataset, the revised virtual representation including a graphical three-dimensional object having data modeled over three axes of the three-dimensional object wherein a first axis of the three axes represents the first category, a second axis represents the second category and a third axis represents the third category, wherein the dimensions representing values of data in the first and second categories of data in the original representation are replaced with a representation of a third category of data representing a mathematical logical combination of the values of data in the first and second categories of data, wherein a dimension of the revised virtual representation representing the different values of data in the third category of data based on the values of data in the first and second categories replaces the dimensions representing values of data in the first and second categories of data in the original representation;
receive input from a user indicating movement on a graphical user interface, by the user, of a pointer representing the first axis that represents the first category to a pointer representing the second axis that represents the second category;
in response to the receiving input from the user indicating the movement of the pointer representing the first axis that represents the first category to the pointer representing the second axis that represents the second category, convert the first and second categories to a single fourth category including a single value representing a mathematical logical combination of the first and second categories;
in response to the converting the first and second categories to the single fourth category, change, on the graphical user interface, the three dimensional object to a two dimensional visualization, showing the conversion of the first and second categories to the single combined fourth category.

9. The system of claim 8 wherein the storage device, under control of the at least one computer processor, is further operable to associate each data cell with one or more classes of data.

10. The system of claim 8, wherein, under control of the at least one computer processor, the computer-generated user interface is further operable to:
receive from the user a selection of a class of data;
display a different virtual representation of the dataset, wherein the different virtual representation of the dataset displayed to the user is restricted to data of data cells associated with the class selected by the user.

11. The system of claim 8, wherein, under control of the at least one computer processor, the computer-generated user interface is further operable to:
receive from the user a selection of a class of data; and
display a different virtual representation of the dataset, wherein the different virtual representation of the dataset is of data cells associated with the class selected by the user and is differentiated visually from data of data cells not associated with that class.

12. The system of claim 8, wherein, under control of the at least one computer processor, the computer-generated user interface is further operable to:
receive from the user a further selection of a category of data displayed in the virtual representation;
receive from the user a selection of a range of one or more values associated with that further selected category; and
display a restricted virtual representation of the dataset, wherein the restricted virtual representation of the dataset displayed to the user is restricted to data corresponding to values within the selected range of values in the further selected category.

13. The system of claim 8, wherein, under control of the at least one computer processor, the computer-generated user interface is further operable to:
receive from the user a selection of a portion of the virtual representation of the dataset representing one or more data values;
receive from the user a command to manipulate the portion of the virtual representation;
determine for each data value represented by the portion of the virtual representation a revised data value reflecting the manipulation made to the virtual representation in relation to at least one of the plurality of categories selected by the user; and
store the revised data values.

* * * * *